United States Patent
Takahashi

(10) Patent No.: US 7,692,808 B2
(45) Date of Patent: Apr. 6, 2010

(54) SYSTEM, METHOD AND COMPUTER PROGRAM PRODUCT FOR CONTROLLING IMAGE INFORMATION

(75) Inventor: Masato Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1340 days.

(21) Appl. No.: 11/123,055

(22) Filed: May 6, 2005

(65) Prior Publication Data
US 2005/0249420 A1 Nov. 10, 2005

(30) Foreign Application Priority Data
May 7, 2004 (JP) .............................. 2004-138996
Mar. 14, 2005 (JP) .............................. 2005-071611

(51) Int. Cl.
*G06F 15/00* (2006.01)
*G06F 17/00* (2006.01)
(52) U.S. Cl. ..................................... 358/1.15; 715/217
(58) Field of Classification Search ................ 358/1.15, 358/1.9, 518, 3.03, 1.14, 1.13, 523, 524, 358/426.05, 520, 402, 448; 382/100, 167, 382/234, 304, 232, 318; 709/227, 201, 220, 709/217, 247, 226; 715/269, 274, 700, 716, 715/764, 201, 203; 400/188, 582, 76; 707/1, 707/10
See application file for complete search history.

(56) References Cited

U.S. PATENT DOCUMENTS

| 5,537,221 A * | 7/1996 | Sawada ...................... 358/450 |
| 6,837,570 B2 | 1/2005 | Takahashi |
| 2003/0107753 A1* | 6/2003 | Sakamoto ................... 358/1.9 |

FOREIGN PATENT DOCUMENTS

| JP | 2001-282482 | 10/2001 |
| JP | 2001-306275 | 11/2001 |
| JP | 2003-114778 | 4/2003 |

* cited by examiner

*Primary Examiner*—Saeid Ebrahimi Dehkordy
(74) *Attorney, Agent, or Firm*—Oblon, Spivak, McClelland, Maier & Neustadt, L.L.P.

(57) ABSTRACT

An image information control method and apparatus, the apparatus includes a receiving unit configured to receive bit map image data sent from an information process unit, and an accumulating unit configured to accumulate the image data received from the information process unit line by line. A blocked unit is configured to group a plurality of lines of the image data into a predetermined size block of image data. A converting unit is configured to convert the block of image data into a language command corresponding to the image forming apparatus and including the block of image data, and a sending unit is configured to send the language command to the image forming apparatus.

23 Claims, 11 Drawing Sheets

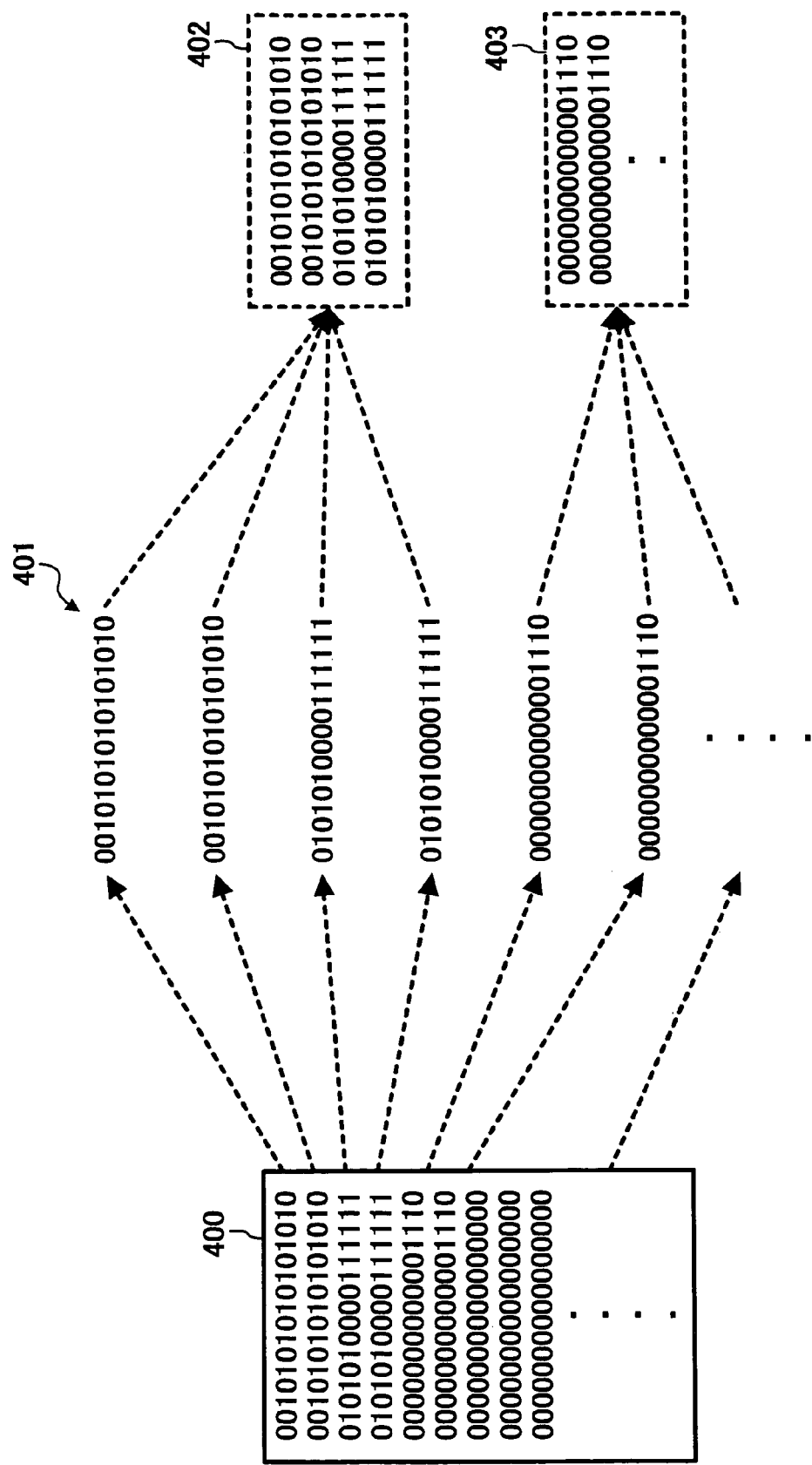

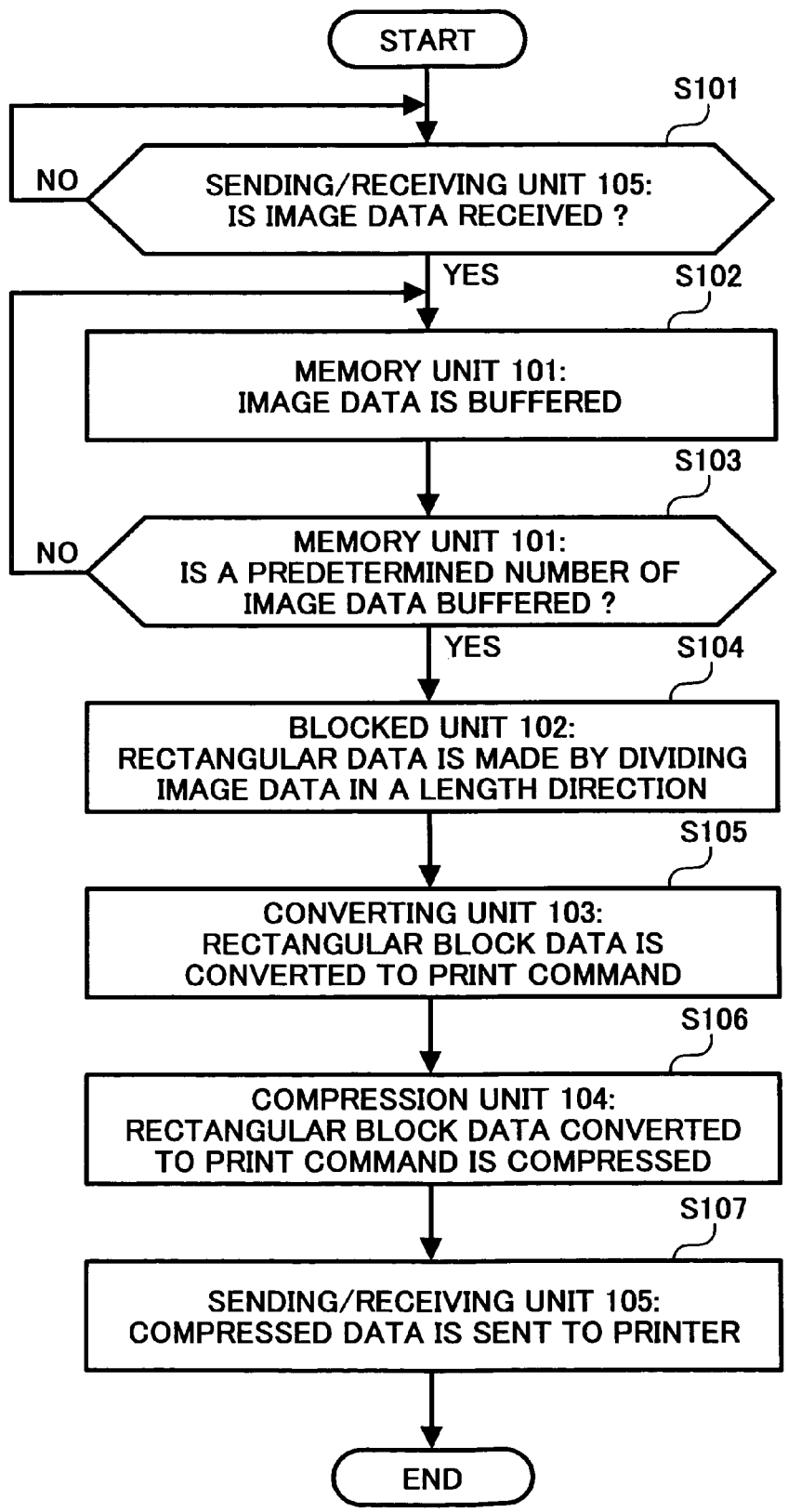

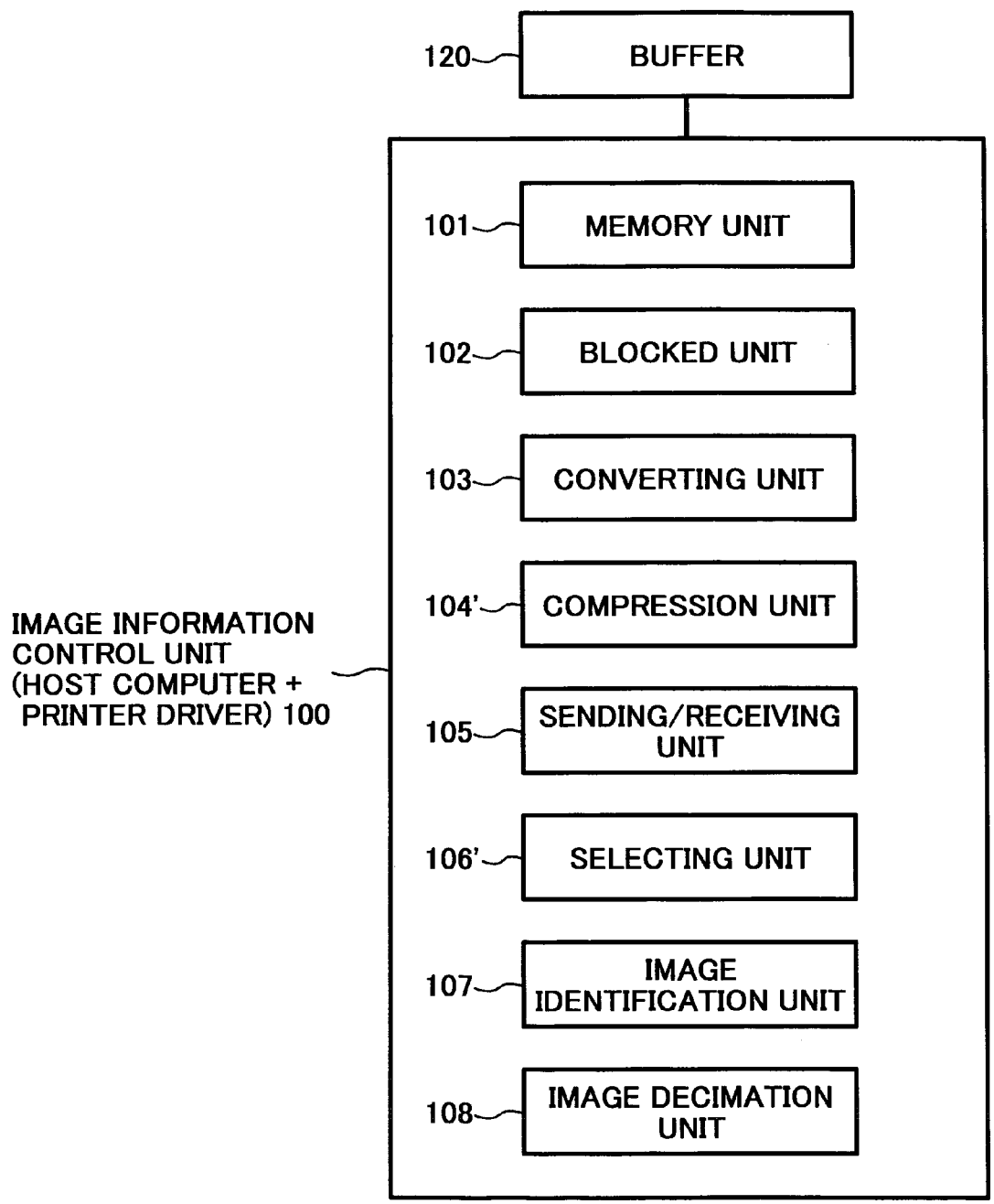

SYSTEM, METHOD AND COMPUTER PROGRAM PRODUCT FOR CONTROLLING IMAGE INFORMATION

CROSS-REFERENCE TO RELATED APPLICATIONS

This patent document is based on and claims priority to Japanese patent application No. 2004-138996 filed on May 7, 2004 and Japanese patent application 2005-071611 filed Mar. 14, 2005. The entire content of these documents is hereby incorporated herein by reference.

BACKGROUND OF THE INVENTION

1. Field of the Invention

The present invention generally relates to controlling image information and more particularly relates to an image information control apparatus, an image information control system, a printer driver, an image information method, a computer program using the method, and a recording medium for converting data from an application program to a printer command corresponding to an image forming apparatus.

2. Description of the Background Art

A printer system generally includes a host computer and a printer device connected to the host computer. A printer driver is typically included in the host computer for converting print data generated by an application program of the host computer to a print command of a printer language. The converted data can be compressed and then sent from the host computer to the printer.

For example, Japanese Laid-Open patent Publication No. 2001-2882482 (the entire contents of which are hereby incorporated herein by reference) describes a technology whereby an application program sends bit map data to a printer driver, which stores the bit map data in a buffer memory. Information that is necessary for deciding on a compression technique is also collected, and a user of the system selects a compression technique to be applied to the stored bit map data. The selected compression technique is then applied to compress the bit map data line by line, and the compressed data is sent to the printer for printing. However, the technology described in patent document JP2001-282482 has a problem in that line by line compression is slow, and a single compression technique may not provide optimum print quality for all lines of the bit map data.

Japanese Laid-Open patent Publication No. 2001-306275 (the entire contents of which are hereby incorporated herein by reference) describes another technology that divides a page of image data into bands including a plurality of lines each. The bands are then compressed using a compression technology selected by the user, and the compressed bands are sent to the printer for printing. While this band technology provides improved efficiency in compression, a boundary between bands is difficult to reproduce at the printer with accuracy. To reduce this problem, each band can include bit map data that overlaps with bit map data of an adjacent band in order to provide redundancy for accurate reproduction of data at the boundaries. This leads to complexity and slow print reproduction, as the overlapping data must be removed by the printer as the printer reproduces the data. Moreover, as with the technology described above, the use of the same compression technique for all bands of print data may lead to poor quality printing for portions of the page.

Finally, Japanese Laid-Open patent Publication No. 2001-114778 (the entire contents of which are hereby incorporated herein by reference) describes a printer apparatus that automatically selects a compression technique that has the lowest feasible compression rate from a group of compression techniques, that can compress image data. While this technique provides improvements in print quality, low compression rates cause slow printing. Moreover, as with the techniques described above, use of a single compression technique for the entire page of print data may lead to poor quality printing for portions of the page.

SUMMARY OF THE INVENTION

An object of the present invention is to provide an image formation control technique that addresses the above described problems of the prior art.

Another object of the present invention is to provide an image information control technique that provides high quality and a high speed image formation.

Yet another object of the present invention is to provide an image information control technique that allows use of different compression techniques for different portions of a print page.

These and/or other objects of the present invention may be provided by an image information control apparatus including a receiving unit configured to receive bit map image data sent from an information process unit, and an accumulating unit configured to accumulate the image data received from the information process unit line by line. A blocked unit is configured to group a plurality of lines of the image data into a predetermined size block of image data. A converting unit is configured to convert the block of image data into a language command corresponding to the image forming apparatus and including the block of image data, and a sending unit is configured to send the language command to the image forming apparatus.

According to another aspect of the invention, a method for controlling image information includes receiving bit map image data sent from an information process unit, accumulating the data sent from the information process unit line by line and grouping a plurality of lines of the image data into a predetermined size block of image data. Also included is converting the block of image data into a language command corresponding to the image forming apparatus and including the block of image data, and sending the language command to the image forming apparatus.

Still another aspect of the invention includes an image information control apparatus having means for receiving bit map image data sent from an information process unit, means for accumulating the image data received from the information process unit line by line and means for grouping a plurality of lines of the image data into a predetermined size block of image data. Also included is means for converting the block of image data into a language command corresponding to the image forming apparatus and including the block of image data and means for sending the language command to the image forming apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

FIG. 3C is a drawing explaining how a page of line data is divided into a blocked bit map image in accordance with the present invention;

FIG. 4 is a flow chart explaining an image information control procedure in accordance with an embodiment of the present invention;

FIG. 7 is a functional block diagram of an image information control unit that may be included or used in accordance with another embodiment of the invention;

DETAILED DESCRIPTION OF THE PREFERRED EMBODIMENTS

Figure 1:
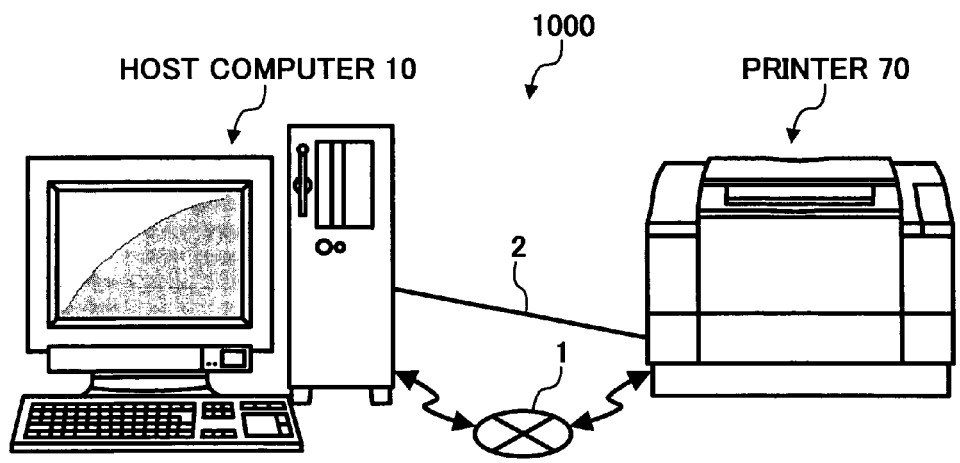
FIG. 1 shows an exemplary printing system in which embodiments of the present invention may be implemented.

Referring now to the drawings, wherein like reference numerals designate identical or corresponding parts throughout the several views, non-limiting embodiments of the present invention are described. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Figure 2:
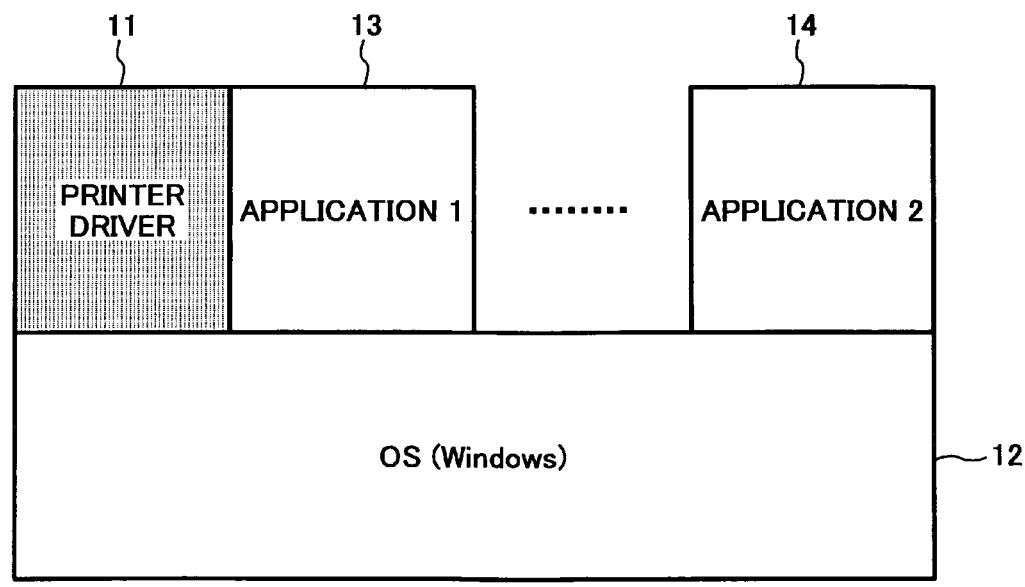
FIG. 2 is a block diagram of software modules that may be included in the host computer 10 in accordance with an embodiment of the invention.

FIG. 1 shows an exemplary printing system in which embodiments of the present invention may be implemented. As seen in this figure, the print system 1000 includes a host computer 10 and a printer 70. The host computer 10 may be directly connected to the printer 70 by way of at least one of the network connection 1 and a direct connection 3. FIG. 2 is a block diagram of software modules that may be included in the host computer 10 in accordance with an embodiment of the invention. The software modules include a printer driver 11, operation system (OS) 12, application 1 (numbered 13) and application 2 (numbered 14). Operation system 12 is a basic software operating system installed in host computer 10, such as Windows® for example. Printer driver 11 is executed on the OS 12 and converts image information for printing from the applications 13, 14 to a print command of a language compatible with printer 70. The applications 13, 14 may be any common applications software such as Word®, Excel® etc. As seen by the ellipses in FIG. 2, the host computer 10 may include more than two applications.

Figure 3A:
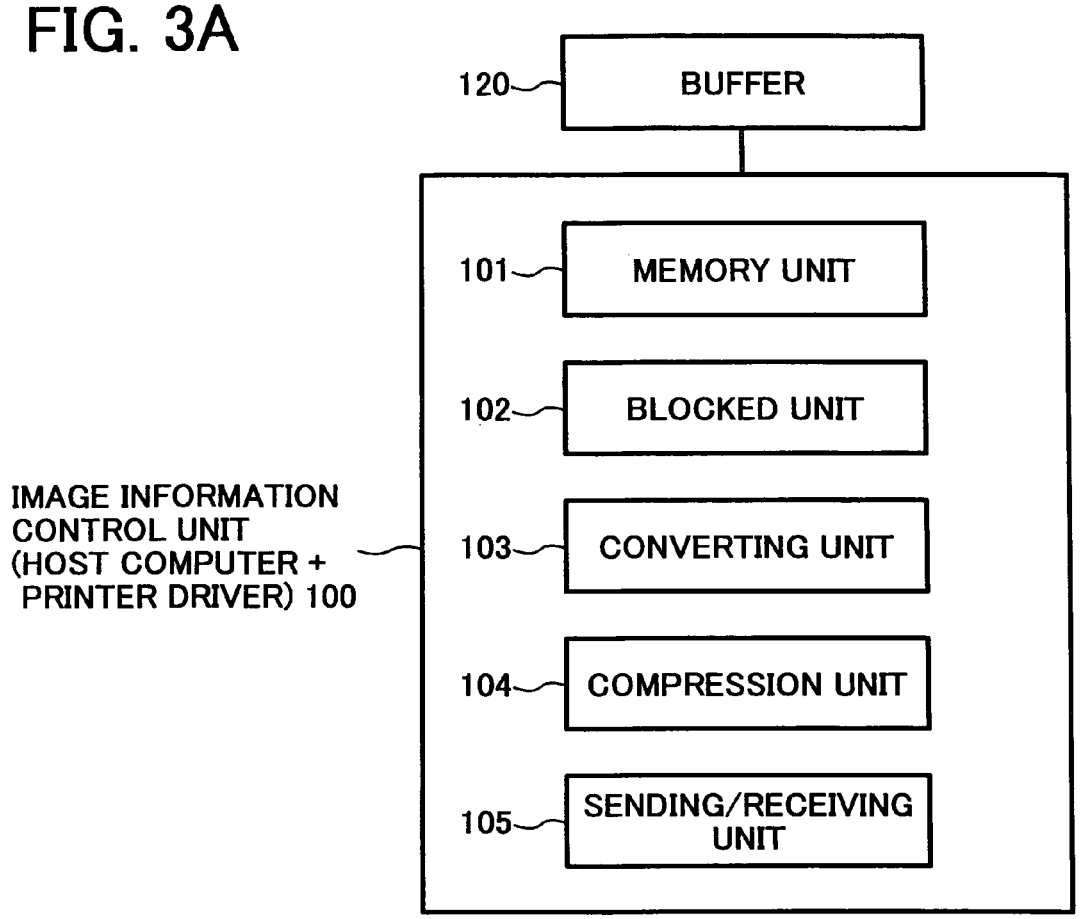
FIG. 3A is a functional block diagram of an image information control unit that may be included or used in accordance with an embodiment of the invention.

FIG. 3A is a functional block diagram of an image information control unit that may be included or used in accordance with an embodiment of the invention. As seen in this figure, the image information control unit can be implemented as a portion of the host computer and printer driver. The image information control unit 100 includes memory unit 101, blocked unit 102, converting unit 103, compression unit 104, sending/receiving unit 105, and buffer 120.

The memory unit 101 stores image information from applications (13, 14) to the buffer 120 every one line of the image temporally, and may be implemented as any known form of memory unit. Blocked unit 102 groups the lines of image information stored in the buffer 120 into blocks of data including a plurality of lines as prescribed. For example, the number of lines per block of data may be prescribed based on user input. Converting unit 103 converts every block of the blocked data to a print language command acceptable to printer 70. Compression unit 104 compresses each block of data converted to a command by converting unit 103. Compression unit 104 is preferably capable of compression using any known lossless compression or lossy compression technique. Sending/Receiving unit 105 sends each block of data converted to a command and compressed to the printer 70.

Figure 3B:
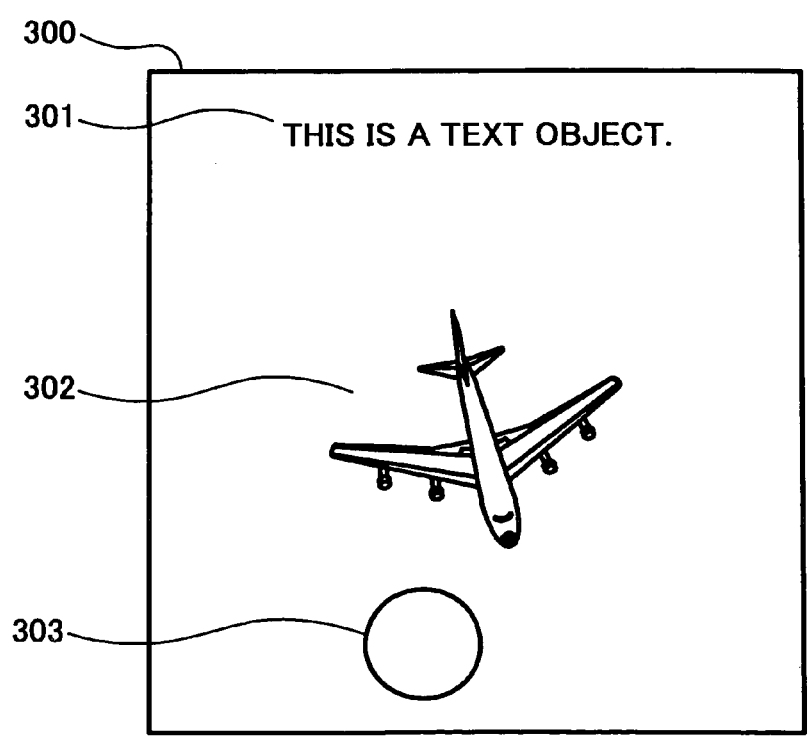
FIG. 3B is a conceptual diagram of an image page for printing.

FIG. 3B is a conceptual diagram of an image page for printing. As seen in this figure, page image 300 can include a variety of types of image data. Specifically, the page image 300 of a document to print out includes a text object 301, an image object 302, and a graphic object 303. A drawing sequence of each object in page image 300 is as follows. A drawing coordinate, font, and text character strings are specified in text object 301. Then, drawing coordinate and compression technology of the bit map data are specified in image object 203 and the bit map data is transferred for the image object 302. Finally, drawing coordinate, size of line, and length of a radius in the drawing circle are specified in graphic object 303. The present invention is particularly related to compression of bit map data sent from an application such as those shown in FIG. 2., for example.

FIG. 3C is a drawing explaining how a page of line data is divided into a blocked bit map image in accordance with the present invention. An application sends one page of bit map image 400 line by line (401) to an image information control unit such as a printer driver. Memory unit 101, for example, buffers data of every one line accepted from the application. Thus, the memory unit 101 can function as an accumulation unit. Blocked unit 102 then makes blocks of the data for a predetermined plurality of lines buffered in memory unit 101, as discussed above. Blocks such as blocks 402 and 403 are created and sent to the printer 70.

FIG. 4 is a flow chart explaining an image information control procedure in accordance with an embodiment of the present invention. The process of FIG. 4 may be performed by a printer driver that receives image data from an application in an image information control apparatus, and sends the image data to an image forming apparatus such as printer.

As seen in FIG. 4, the printer driver, for example, first determines weather image data has been received by the sending/receiving unit 105 from the application, as seen in step S101. If no image data has been received (NO from S101), step S101 repeats itself such that the printer driver continually monitors for image data. If the image data from the application is received (YES from S101), memory unit 101 buffers the received image data line by line as shown by step S102. The image data may be bit map image data that is buffered line by line. Then in step S103, it is determined whether buffered image data in memory unit 101 has buffered a predetermined number of lines (n). If it is determined that a predetermined number of lines (n) has not been buffered (NO from step S103), then the process returns to S102 where image data continues to be buffered line by line. If the memory unit has buffered the predetermined number of lines of image data (n) (YES from in S103), the process proceeds to step S104 where blocked unit 102 divides the image data into groups of plural lines (S104). In one embodiment, the blocked unit 102 divides the image data in a length direction to form rectangular blocks such as those shown in FIG. 3C.

Once the image data is divided into rectangular blocks, the converting unit 103 converts the blocks of data to print commands understandable to the printer as shown in step S105. Further, compression unit 104 compresses each converted rectangle block of command data in step S106. In step S107, sending/receiving unit 105 sends the blocks of compressed data to printer 70. In the embodiment of FIG. 4, the user may set the number of lines included in a block of data, to be suited to a process of the printer.

As described above, in one embodiment of the invention, the image control apparatus groups image data into rectangular blocks including a plurality of lines, and each block is converted into a print command that is compressed and sent to the printer. Thus, the number of conversions to print commands can be reduced, and compression can be performed in blocks, which allows efficient sending of print commands at the host computer side. In addition, since a command is not sent with every line of bit map data one by one, but rather the commands are sent together with rectangular block data, the number of commands is reduced and easier to process on the printer side. This allows high speed printing at the printer side. Still further, when the image data is rotated and output according to a direction of the print sheet, the image data can be output without a big difference in the performance of printing out.

Furthermore, it is known to send compressed data when bit map image data is sent, however the present invention can provide a higher rate of image compression as it is possible to apply a delta—raw compression system by making rectangular image data and sending the command and rectangular data together as described above. Finally, in the embodiment of FIG. 4, because the divided rectangle blocks are first converted to a print command, the blocks do not overlap with one another as with the blocks of bit map data discussed in the Background section above. Thus, compression, reproduction and printing can be accomplished more efficiently than the prior art discussed above.

Figure 5:
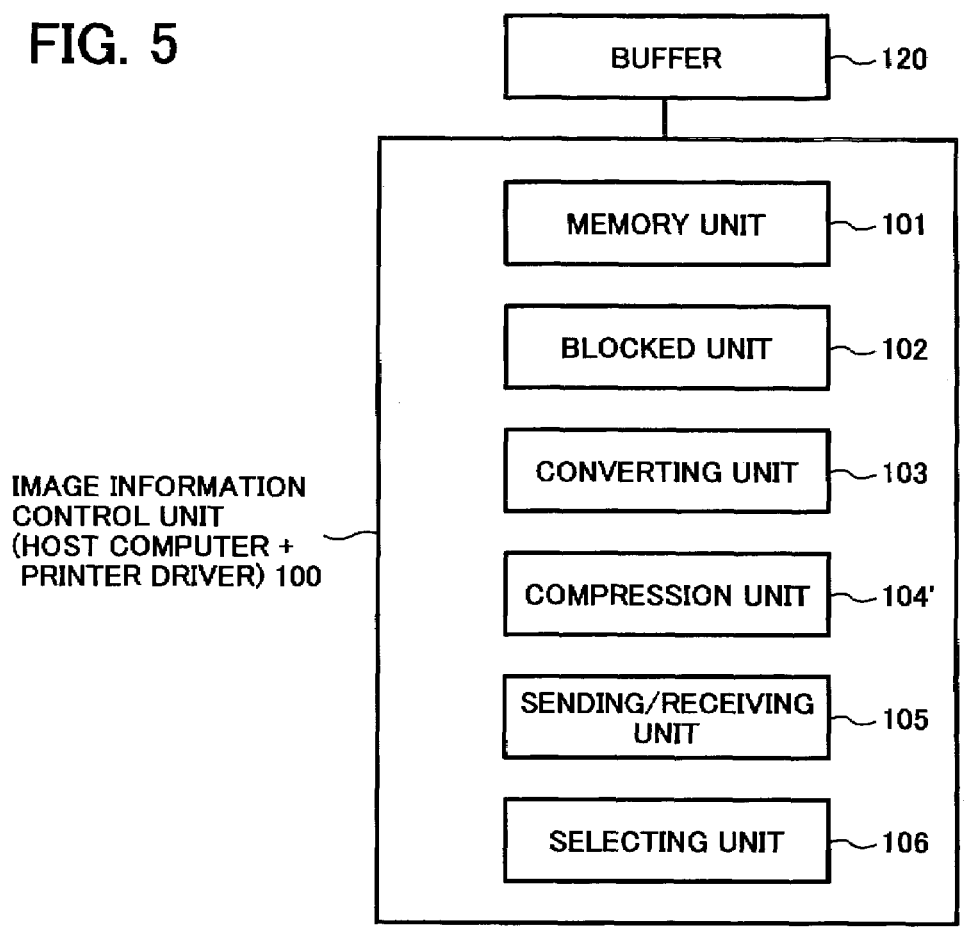
FIG. 5 is a functional block diagram of an image information control unit or apparatus that may be included or used in accordance with an embodiment of the invention.

FIG. 5 is a functional block diagram of an image information control unit or apparatus that may be included or used in accordance with an embodiment of the invention. As seen in this figure, the image information control unit 100 includes memory unit 101, blocked unit 102, converting unit 103, compression unit 104', sending/receiving unit 105, selecting unit 106 and buffer 120.

The memory unit 101 stores image information from applications (13, 14) to the buffer 120 every one line of the image temporally, and may be implemented as any known form of memory unit. Blocked unit 102 divides or groups the lines of image information stored in the buffer 120 into blocked data including a plurality of lines. Converting unit 103 converts every block of the blocked data to a print language command acceptable to printer 70. Compression unit 104 compresses each block of data converted to a command by converting unit 103. Compression unit 104 is preferably capable of compression using any known lossless compression or lossy compression technique. Sending/Receiving unit 105 sends each block of data converted to a command and compressed to the printer 70.

In the embodiment of FIG. 5, compression unit 104' is capable of executing a variety of compression techniques. For example Run length compression, delta—raw compression, or any other known compression technique, can be performed by the compression unit 104'. In the embodiment of FIG. 5, the selecting unit 106 selects a high (or low) compression rate for each block of image data based on a comparison of compression rates achieved by the different compression techniques. Specifically, the present inventors have realized that different compression techniques provide different compression rates for different types of image data. For example, one compression technique may provide a 30:1 compression rate for photo graphic data, while only providing a 10:1 compression rate for other data such as graphic or text data. Similarly, a second compression technique may provide 20:1 compression for photographic data, while providing 15:1 compression for other data as graphic or text data. Thus, for documents having different types of image data, a single compression technique cannot provide an optimum compression technique (such as a high or low compression rate depending on user needs) for each area of the document. Moreover, where photographic data should be compressed using the highest compression rate, and other data such as text and graphic data should be compressed using the lowest compression rate, more than one compression technology may be desired. The selecting unit 106 in the embodiment of FIG. 5 addresses this problem.

Figure 6:
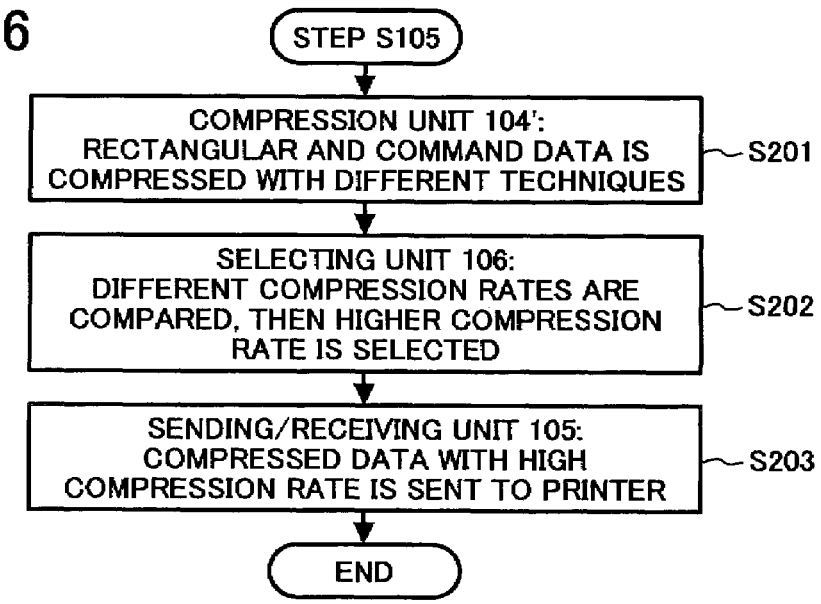
FIG. 6 is a flow chart explaining an image information control procedure in accordance with another embodiment of the present invention that can be implemented on the image information control unit of FIG. 5.

FIG. 6 is a flow chart explaining an image information control procedure in accordance with another embodiment of the present invention that can be implemented on the image information control unit of FIG. 5. The process of FIG. 6 may be performed by a printer driver that receives image data from an application in an image information control apparatus, and sends the image data to an image forming apparatus such as a printer.

As seen in FIG. 6, the process of this figure continues after step S105 of FIG. 4. Referring to FIG. 4, the printer driver first determines weather image data has been received by the sending/receiving unit 105 from the application, as seen in step S101. If no image data has been received (NO from S101), step S101 repeats itself such that the printer driver continually monitors for image data. If the image data from the application is received (YES from S101), memory unit 101 buffers the received image data line by line, as shown by step S102. Then in step S103, it is determined whether buffered image data in memory unit 101 has buffered a predetermined number of lines (n). If it is determined that a predetermined number of lines (n) has not been buffered (NO from step S103), then the process returns to S102 where image data continues to be buffered line by line. If the memory unit has buffered the predetermined number of lines of image data (n) (YES from in S103), the process proceeds to step S104 where blocked unit 102 divides the image data in a length direction into groups of plural lines such as that shown in FIG. 3C (S104). Once the image data is divided into rectangular blocks, the converting unit 103 converts the rectangle data to print commands understandable to the printer as shown in step S105.

Returning again to FIG. 6, after the image data is grouped into rectangular blocks and converted to print commands, the compression unit 104' compresses each rectangle print command data using a plurality of different compression techniques as shown by step S201. For example, all or a portion of a block of print command data may be compressed using two separate compression techniques. A sample portion of the block may be compressed using the plurality of different compression techniques in order to provide efficient testing for selection of a compression technique.

In step S202, the selecting unit 106 selects one of the plurality of compression techniques used in S201 based on a compression rate parameter. In the embodiment of FIG. 6, the compression rate parameter is to provide the highest compression rate in order to achieve high speed printing. Thus, in step S202, the selecting unit 106 compares the data compressed with different compression technologies and selects the compression technique that provides the highest compression rate for the block. Once the compression technique is selected, the sending/receiving unit 105 sends data compressed with the selected technique to printer 70 (S203). The compression technique may be selected based on the user's selection of either a high compression rate to achieve greater speed but lower quality reproduction, or a low compression rate for higher quality but lower speed. In one embodiment, the user indirectly selects a compression rate by inputting a desired image resolution into an input device of the image information control apparatus.

Thus, according to the embodiment of FIG. 5 and FIG. 6, the printer driver can select a better compression rate (whether high rate or low rate) by comparing the compression rate of different compression techniques applied to the blocked image data. Because a different compression technique can be used for different blocks of image data, it is possible to provide an overall improved speed and performance printing without a heavy load on the printer.

FIG. 7 is a functional block diagram of an image information control unit that may be included or used in accordance with another embodiment of the invention. As seen in this figure, the image information control unit 100 includes memory unit 101, blocked unit 102, converting unit 103, compression unit 104', sending/receiving unit 105, selecting unit 106, image identification unit 107, image decimation unit 108 and buffer 120.

The memory unit 101 stores image information from applications (13, 14) to the buffer 120 every one line of the image temporally, and may be implemented as any known form of memory unit. Blocked unit 102 divides the lines of image information stored in the buffer 120 into blocked data including a plurality of lines as prescribed. Converting unit 103 converts every block of the blocked data to a print language command acceptable to printer 70. Compression unit 104 compresses each block of data converted to a command by converting unit 103. Compression unit 104 is preferably capable of compression using any known lossless compression or lossy compression technique. Sending/Receiving unit 105 sends each block of data converted to a command and compressed to the printer 70.

As described with respect to FIG. 5, compression unit 104' is capable of executing a variety of compression techniques, and the selecting unit 106 selects a compression technique for each block of image data based on a comparison of compression rates achieved by different compression techniques. The present inventors have recognized that certain image data such as a photographic image data can be reproduced at a high quality appearance even if the image information is decimated in a main-scan direction and/or in the sub-scan direction. Thus, in the embodiment of FIG. 7, the image identification unit 107 identifies a type of image data, such as photographic image data or text data, for each block, and an image decimation unit 108 decimates the block based on the image type determined. Also, in the embodiment of FIG. 7, the selecting unit 106' can also select a decimation technique if the best compression rate for a block of image data is not high enough, as will be described further below.

Figure 8A:
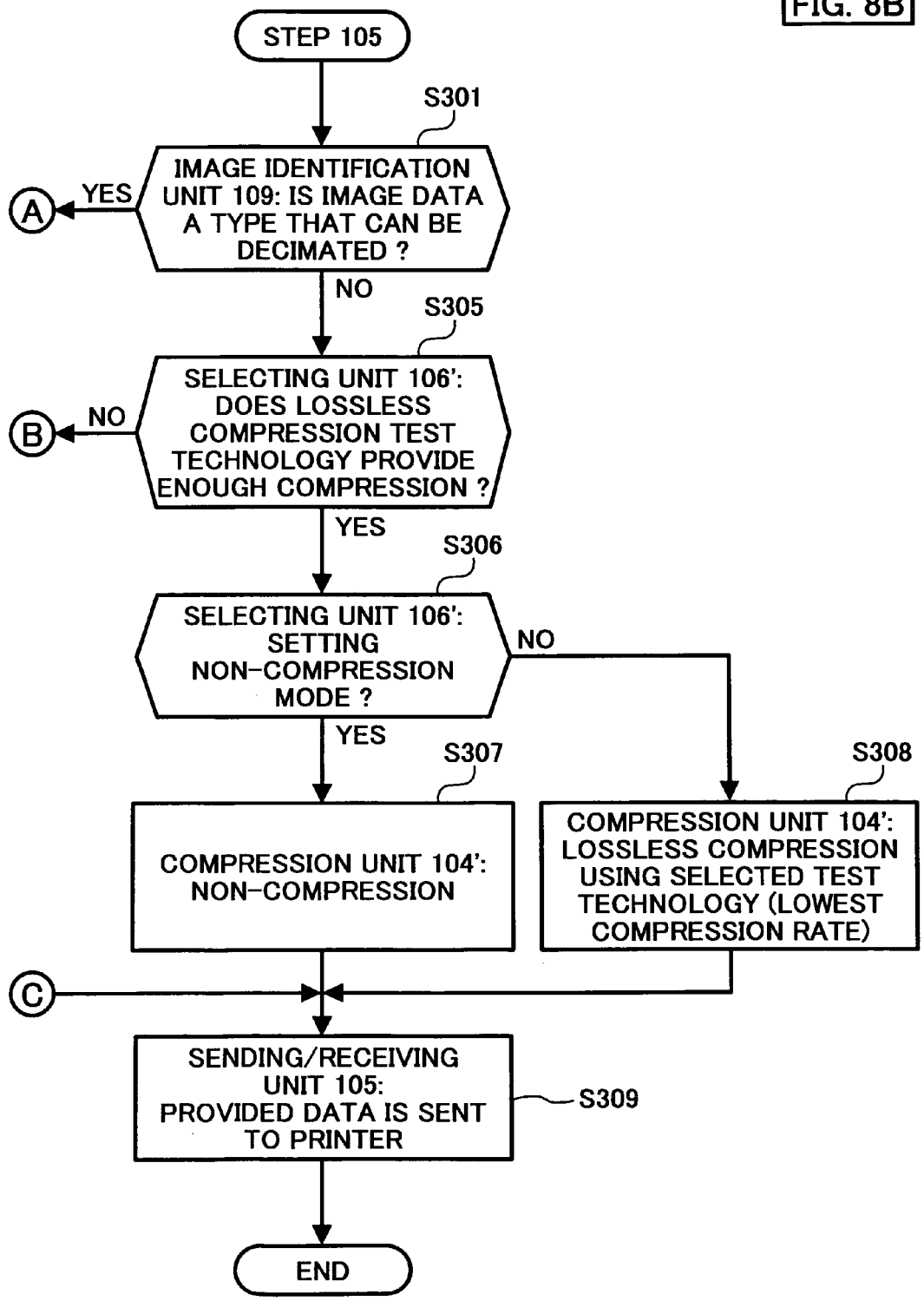
FIG. 8 (including FIGS. 8A and 8B) is a flow chart explaining an image information control procedure in accordance with another embodiment of the present invention that can be implemented on the image information control unit of FIG. 7.
Figure 8B:
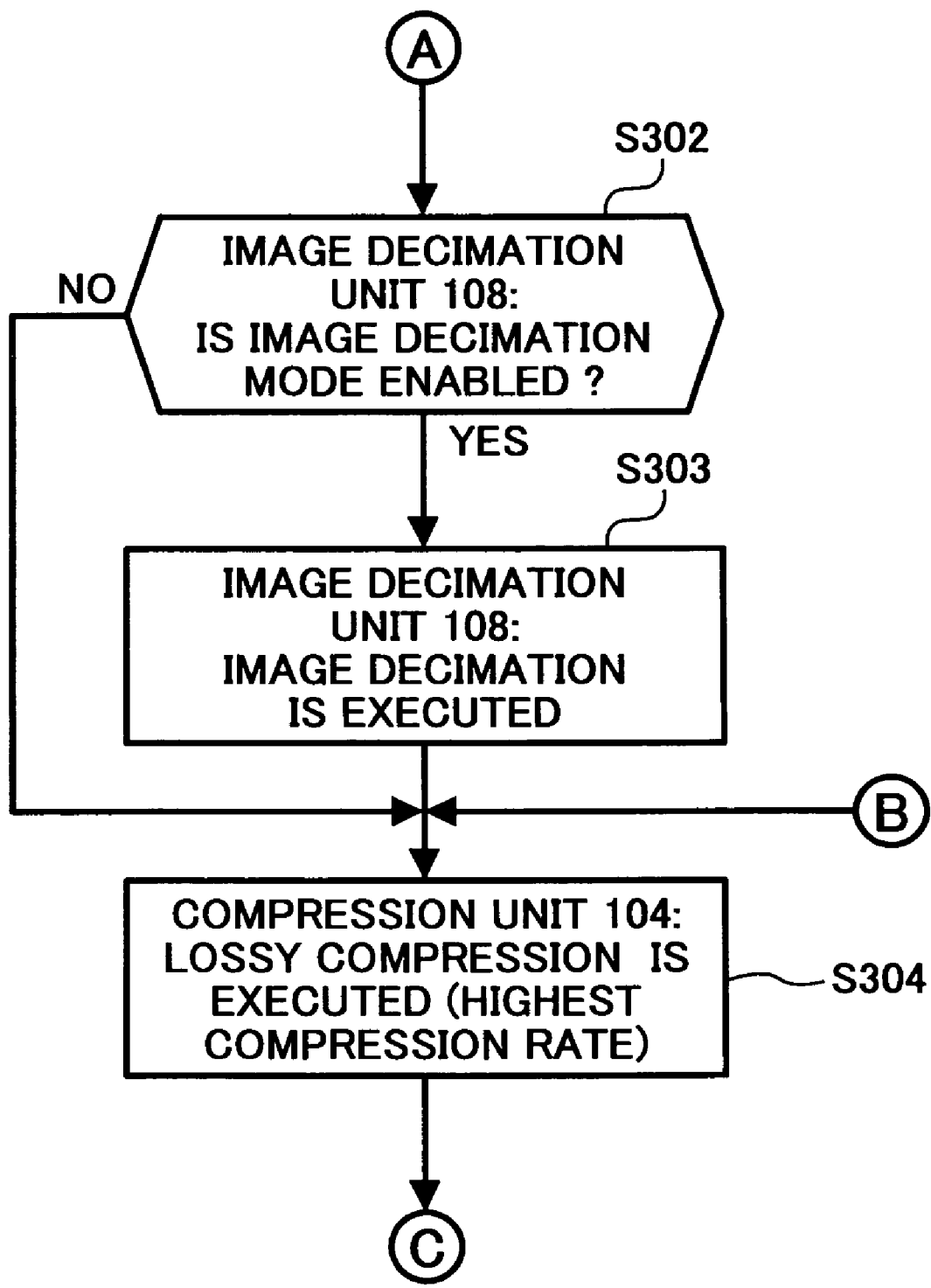

FIG. 8 (including FIGS. 8A and 8B) is a flow chart explaining an image information control procedure in accordance with another embodiment of the present invention that can be implemented on the image information control unit of FIG. 7. The process of FIG. 8 may be performed by a printer driver that receives image data from an application in an image information control apparatus, and sends the image data to an image forming apparatus such as a printer.

As seen in FIG. 8A, the process of this figure continues after step S105 of FIG. 4. Referring to FIG. 4, the printer driver first determines weather image data has been received by the sending/receiving unit 105 from the application as seen in step S101. If no image data has been received (NO from S101), step S101 repeats itself such that the printer driver continually monitors for image data. If the image data from the application is received (YES from S101), memory unit 101 buffers the received image data as shown by step S102. Then in step S103, it is determined whether buffered image data in memory unit 101 has buffered a predetermined number of lines (n). If it is determined that a predetermined number of lines (n) has not been buffered (NO from step S103), then the process returns to S102 where more image data is buffered. If the memory unit has buffered the predetermined number of lines of image data (n) (YES from in S103), the process proceeds to step S104 where blocked unit 102 divides the image data in a width direction into groups of plural lines such as that shown in FIG. 3C (S104). Once the image data is divided into rectangular blocks, the converting unit 103 converts the rectangle data to print commands understandable to the printer as shown in step S105.

Returning to FIG. 8A, the image identification unit 107 identifies whether a block of image data is a type of data that can be decimated without causing poor quality reproduction as seen in step S301. Step S301 may be performed based on blocked bit map data sent by an application, or on blocked data converted to print commands. This determination in step S301 may be made based on a predetermined threshold density of pixels in the image data or on any known method of determining whether decimation will adversely affect reproduction of the image data. The determination in step S301 may be performed by the image identification unit counting the overall number of pixels in the image data or calculating the number of pixels per area of the image data for printing out. In one embodiment, step S301 may determine if the image data is photographic data, which is generally capable of decimation without significant reduction in the appearance during printing. However, whether image data is of a type acceptable for decimation may vary depending on parameters such as a desired quality of a printed document, print speed, etc.

If the image data identified in step S301 is acceptable for decimation (for example identified as photographic data), the process proceeds to step S302 shown in FIG. 8B. In S302, it is determined whether an image decimation mode has been enabled in the image decimation unit 108. If a decimation mode is enabled (YES from S302), then decimation unit 108 decimates the image data as shown in Step S303, and the compression unit 104 executes lossy compression on the decimated data in step S304. If a decimation mode is determined not to be enabled in step S302 (NO from step 302), then the process skips decimation step S303 and executes a lossy compression in step S304. In one embodiment, the lossy compression performed in step S304 is based on a selection made by the selecting unit 106' as discussed above. Whether decimation is performed or not, the process continues to step S309 in FIG. 8A where the compressed image data is sent to the printer by the sending/receiving unit 105.

Returning again to step S301, if the image identification unit 109 determines that the block of image data is not acceptable for decimation (for example, not photographic data), then selection unit 106' identifies whether a lossless compression technique can provide an acceptable rate of compression. In the embodiment of FIG. 8A, the determination is based on using a test lossless compression technique, and determining if the test technique provides a threshold compression rate as shown by step S305. If it is determined that the test lossless compression technique does not provide acceptable compression (NO from S305), then the process continues to step S304 in FIG. 8B where lossy compression is executed, and step S309 in FIG. 8A where the data is sent to the printer as noted above.

If the selection unit 106' determines in step S305 that acceptable compression can be provided by the test lossless compression technology (YES from S305), then it is checked whether a non-compression mode has been set in step S306. Where non-compression has been set (YES from step S306), the image data is not compressed as indicated by the non-compression step S307, and the non-compressed image data is sent to the printer as shown by step S309. Where non-compression has not been set (NO from step S306), lossless compression is executed in step S308, and the compressed image data is sent to the printer in step S309. For example, a lossless compression technology having a low rate of compression may be selected for a block of image data as shown in step S308. The lossless compression technique of step S308 may be the test lossless compression technology of step S305, or may be a different lossless compression technology.

Thus, in the embodiment of FIGS. 7 and 8, if it is decided that the image data is a type that can be decimated (for example, photographic data), then the image data is decimated and compressed using lossy compression before sending to the printer. If the image data cannot be decimated, then it is determined if lossless compression provides enough compression for the image data. If lossless compression is not adequate, then lossy compression is performed before sending the data to the printer. If lossless compression is adequate, then it is determined if a non-compression mode has been set. If non-compression has been set, the data is sent to the printer without compression. If lossless compression is adequate and non-compression has not been set, then lossless compression it is performed before sending the image data to the printer.

As the rate of compression can be higher with using lossy compression in the case of a photographic image etc., higher throughput can be expected. Furthermore, by paying attention to obtaining a high throughput, a reduction in the amount of unnecessary data can be expected.

In one example, when the image data is a photographic data, then the decimation is executed and lossy compression technology is executed at a high compression rate to provide high throughput at acceptable quality. When the image data is not photographic data (for example, text or graphic data) and lossless compression does not provide enough compression, then lossy compression is also performed on the non-photographic data. If the image data is not a photographic data and lossy compression can provide enough compression, then lossy compression technology is performed to provide a lower rate of compression at acceptable throughput. If the image data is not a photographic data and lossy compression can provide enough compression, then the image data may be sent to the printer without compression if a non-compression mode is set. This non-compression provides the highest quality at acceptable throughput. By means of this construction, it is possible to provide an image information control apparatus with high performance printing.

Further, it is possible to get a high performance printing with reducing an amount of the data as executing the decimation with bi-direction of x, y independently.

Furthermore, as the condition that the printer driver to decimate the image is set very conservatively (such as where only photographic data is decimated), it is possible to provide a high quality output and to provide a high performance throughput with a low load of the output if the condition is matched.

Figure 9:
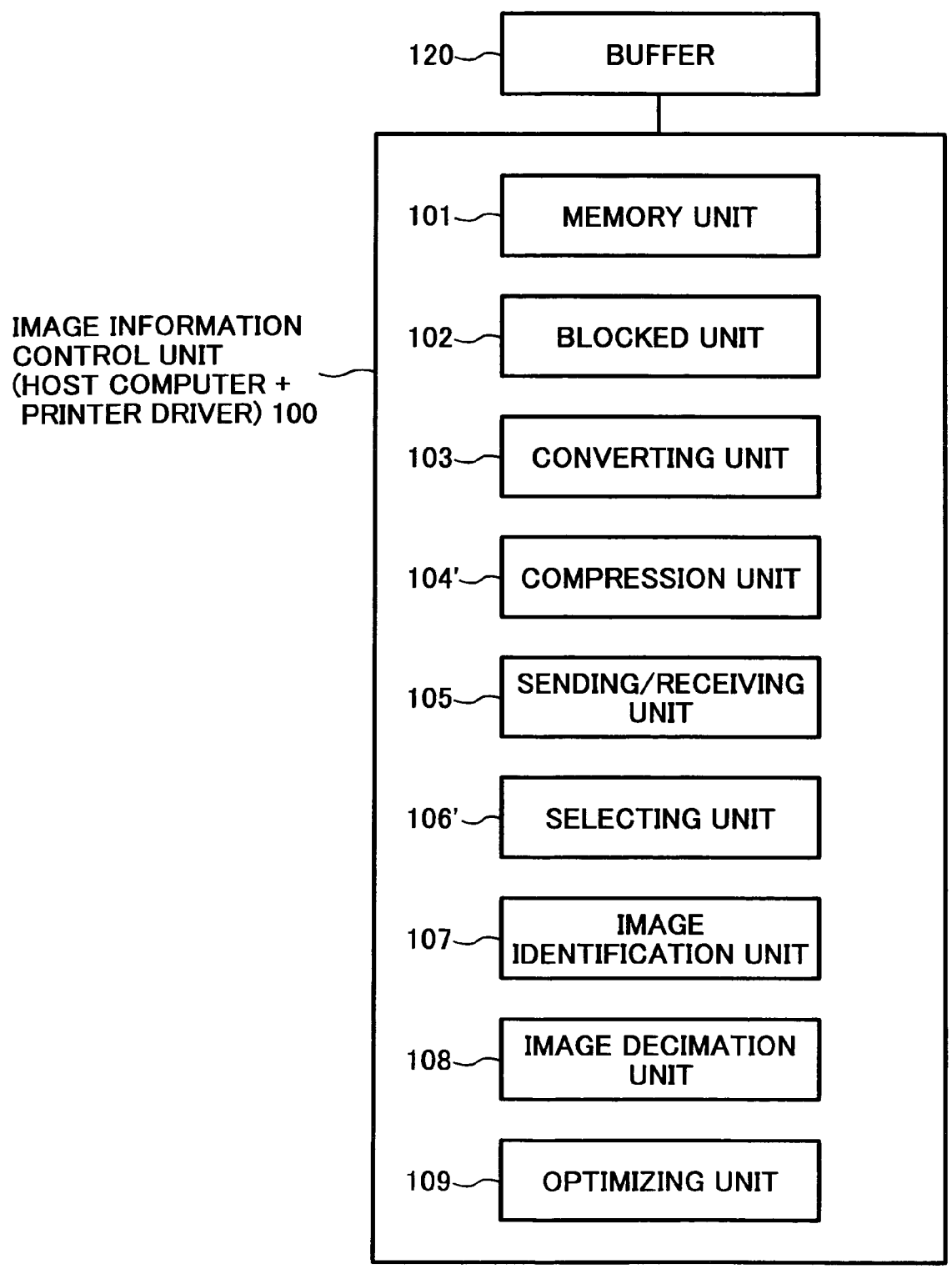
FIG. 9 is a functional block diagram of an image information control unit that may be included or used in accordance with another embodiment of the invention.

FIG. 9 is a functional block diagram of an image information control unit that may be included or used in accordance with another embodiment of the invention. As seen in this figure, the image information control unit 100 includes memory unit 101, blocked unit 102, converting unit 103, compression unit 104', sending/receiving unit 105, selecting unit 106', image identification unit 107, image decimation unit 108, optimizing unit 109 and buffer 120.

The memory unit 101 stores image information from applications (13, 14) to the buffer 120 every one line of the image temporally, and may be implemented as any known form of memory unit. Blocked unit 102 divides the lines of image information stored in the buffer 120 into blocked data including a plurality of lines as prescribed. Converting unit 103 converts every block of the blocked data to a print language command acceptable to printer 70. Compression unit 104 compresses each block of data converted to a command by converting unit 103. Compression unit 104 is preferably capable of compression using any known lossless compression or lossy compression technique. Sending/Receiving unit 105 sends each block of data converted to a command and compressed to the printer 70.

As described above, compression unit 104' is capable of executing a variety of compression techniques, and the selecting unit 106 selects a compression technique for each block of image data based on a comparison of compression rates achieved by different compression techniques. In addition, the image identification unit 107 identifies a type of image data, such as photographic image data, for each block, and an image decimation unit 108 decimates the block based on the image type determined. The embodiment of FIG. 9 also includes an optimizing unit 109 that optimizes the condition of compression of the blocked image data converted to command data. That is, in the embodiment of FIG. 9, selecting unit 106' selects the compression technology including lossy compression of the blocked image data converted to command, according to the decision of the optimizing unit 109.

In the optimizing unit 109, the condition of the compression of the blocked image data includes no compression of the image information data, compression of the data and what kind of compression technology is used. Further in the optimizing unit, the optimized condition is determined by optimizing parameters including a rate of compression, a type of connection to the printer, a data size of original image data, required time for compression/decompression etc. In the unit 106', the optimizing parameters may be represented as, for example:

Different compression technologies: x=x 1,–x n,
Connecting system to printer: p=parallel system is p1, serial system is p2,
Data size of original image: s
Required time for compression/decompression: t The performance of printer output is determined by each parameter: x, p, s, and t. The performance variation amount is described by the function $f(x, p, s, t)$. If the function $f(x, p, s, t)$ is calculated to give the highest effective function value in the function values provided with each parameter $(x, p, s, t)$, an image information control system decided by the selected parameter becomes an optimum image processing system. In one embodiment, the function is not calculated, but rather a function table is used to store the function values that are made by the function f (x, p, s, t) defined by each parameter (x, p, s, t). The optimization can be decided with the table generated from the function values.

By this means, optimizing unit 109 can execute the optimization of printer output. In other words, depending on the image data, the printing time with the compression becomes longer than the time without compression because compression and decompression take a long time. In the result, the performance of printer comes down. In the case of such an image data, the printer driver determines automatically which compression technology should be used for transferring the image data according to the connection status with printer before printer driver send the data. As the result, the printer can get the most suitable performance for printing.

Furthermore, as printer driver determines the transfer technology of the image data automatically according to a user's demand, both demand of an image quality and a performance of the printer can be achieved.

Figure 10:
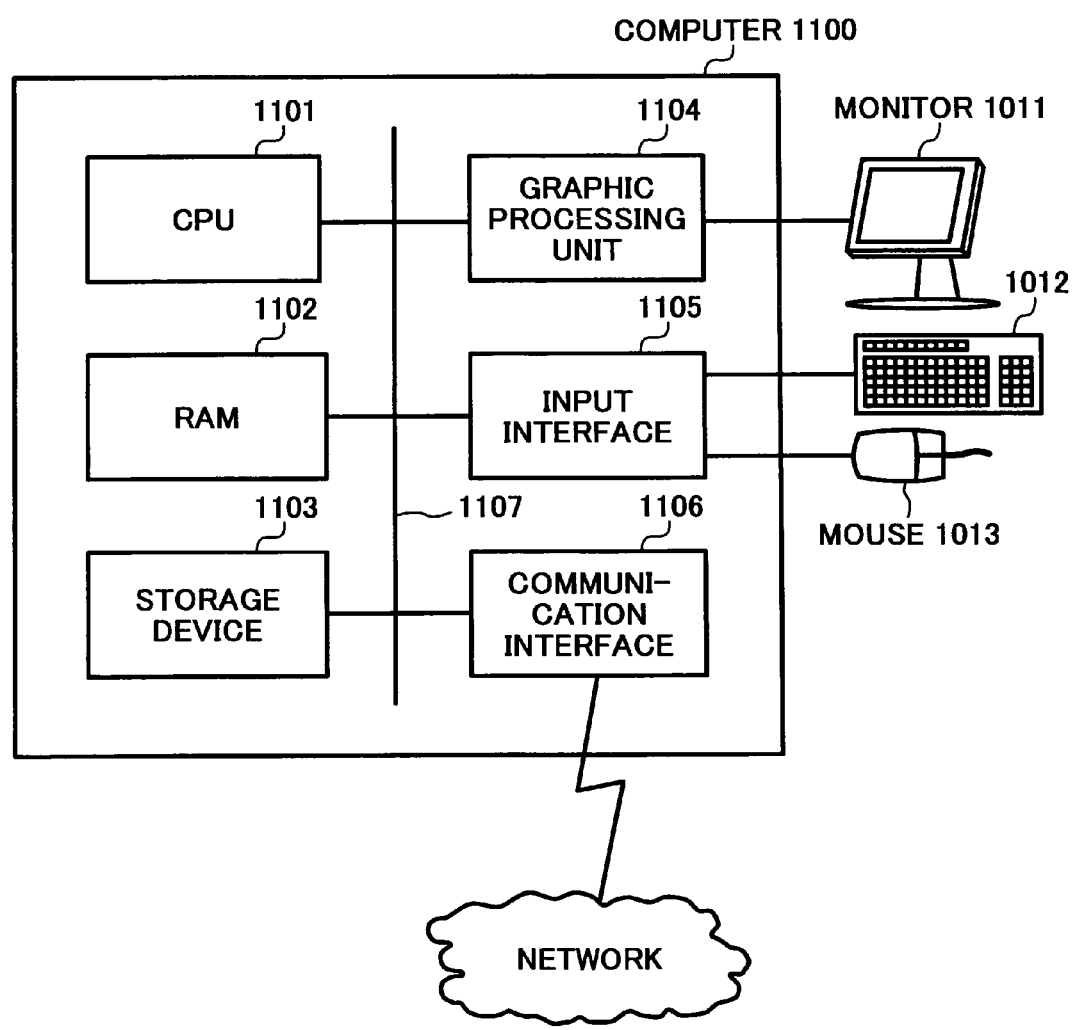
FIG. 10 is a block diagram illustrating a hardware configuration of an image information control apparatus in accordance with an embodiment of the present invention.

FIG. 10 is a block diagram illustrating a hardware configuration of an image information control apparatus in accordance with an embodiment of the present invention. As seen in this figure, the image control apparatus includes a computer 1100, monitor 1011, and input devices 1011 and 102. As also seen in FIG. 10, the computer 1100 may be connected to a network. The computer 1100 includes CPU 1101, Ram 1102, storage device 1103, graphics processing unit 1104, imputer interface 1105, and communications interface 1106.

CPU 1101 is a controller that controls all of the image information control apparatus, and RAM 1102 is a readable and writable memory used as a memory for development of program instructions and data, image drawing memory in information processing, and so on. Storage device 1103 is a read only memory (ROM) or hard drive device (HDD) for storing software programs and data. The graphics processing unit 1104 communicates with the monitor 1101 to display graphics on the monitor, and the input interface 1105 enables the input devices 1012 and 1013 to input information into the computer 1100. Communications interface 1106 is coupled to the network to enable network communications for the computer 1100.

Any of the image information control procedures in accordance with the present invention may be performed on the image information control apparatus of FIG. 10. The image information control procedure executed in the image information control apparatus can be an installable and executable file format provided on a computer readable medium such as a CD-ROM, flexible disk (FD), CD-R, DVD (Digital versatile disk) etc. Furthermore, the image information control procedure executed in the image information control apparatus can be stored on a remote computer connected to computer 1100 through network such as the internet etc, through which the control procedure can be downloaded to the computer 1100.

Furthermore, the image information control program executed in the image information control apparatus is composed of modules including parts described above (memory unit, blocked unit, converting unit, compression unit, and sending/receiving unit etc,). As to actual hardware, CPU 1101 (processor) reads the image information control program from the ROM storage device 1103 described above and executes the program. With that, each part of the modules described above are generated on the main memory of the computer 1100 by CPU 1101. That is the memory unit, blocked unit, converting unit, compression unit and sending/receiving unit etc, are generated on the main memory of the computer 1100 by CPU.

Figure 11:
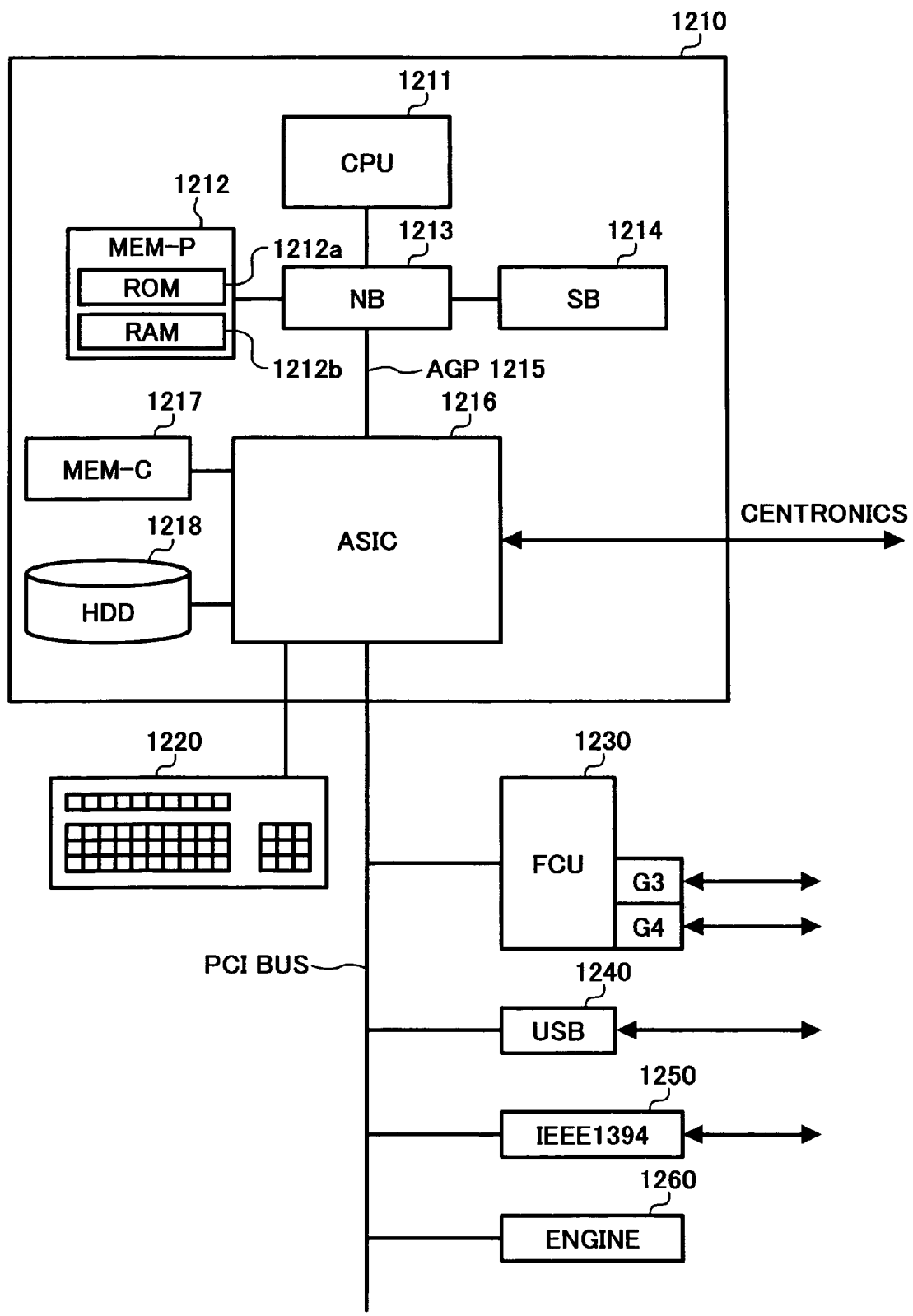
FIG. 11 is a block diagram illustrating a hardware configuration of a digital copier in accordance with an embodiment of the present invention.

FIG. 11 is a block diagram illustrating a hardware configuration of a digital copier in accordance with an embodiment of the present invention. As shown in FIG. 11, the digital copier includes controller 1210 connected through PCI (Peripheral Component Interconnect) bus to input device (keyboard) 1220, FCU (Facsimile Control Unit) 1230, USB (Universal Serial Bus) 1240, IEEE (the institute of Electrical and Electronics Engineers) 1394 interface 1250 and engine unit 1260. Controller 1210 is a controller for controlling the digital copier and inputs from an image reading unit, image process unit, and operation unit (not illustrated in FIG. 11).

Controller 1210 includes CPU 1211, system memory (MEM-P) 1212, north bridge (NB) 1213, south bridge (SB) 1214, AGP (Accelerated Graphic Port) 1215, ASIC (Application Specific Integrated Circuit) 1216, local memory (MEM-C) 1217, and hard disk drive (HDD) 1218. North bridge 1213 and ASIC 1216 are connected with the AGP (Accelerated Graphic Port) 1215 in the controller 1210. Further, MEM-P1212 includes ROM (Read Only Memory) 1212a and RAM(Random Access Memory) 1212b.

CPU 1211 controls the digital copier and may be connected to other equipment with a chipset. NB 1213 is a bridge for connecting CPU 1211, MEM-P 1212, SB 1214, and AGP 1215. CPU 1211 includes memory controller for controlling reading and writing to MEM-P 1212, PCI master, and AGP (Accelerated Graphics Port) target. MEM-P1212 consists of ROM 1212a and RAM 1212b. ROM 1212a is a read only memory used for storage of software programs and data. RAM 1212b is a readable and writable memory used as a development memory of program instructions and data, and image drawing memory in information processing. SB 1214 is a bridge for connecting NB 1213 with a PCI device and peripheral devices. The SB1214 is connected to NB 1213 through a network, for example. The PCI bus may also be connected with a network interface (I/F) etc.

ASIC 1216 is an application specific IC (integrated Circuit) for a multi media information process. ASIC 1216 assumes the role of a bridge connecting AGP 1215, PCI bus, HDD 1218, and MEM-C1217. The ASIC 1216 is connected through the PCI bus with FCU 1230, USB (Universal Serial Bus) 1240, IEEE (the institute of Electrical and Electronics Engineers) 1394 interface 1250 and engine unit 1260.

AGP 1215 is a bus interface for a graphic accelerator card proposed to make high speed graphics processing. AGP 1215 allows a graphics accelerator card high speed accessing directly to MEM-P 1212 with high through put. MEM-C 1217 is a local memory used as an image buffer. HDD 1218 is a storage used for accumulating of program, accumulating of font data, and accumulating form. Keyboard 1220 connecting to ASIC 1216 communicates operating input to ASIC 1216.

Engine unit 1260 is an information processing engine connectable to PCI bus. For example, an information process unit providing error diffusion and γ correction against the inputted image data can be included in the engine unit 1260.

Any of the image information control procedures in accordance with the present invention may be performed on the digital copier of FIG. 11. The image information control procedure executed in the image digital copier can be an installable and executable file format provided on a computer readable medium such as a CD-ROM, flexible disk (FD), CD-R, DVD (Digital versatile disk) etc. Furthermore, the image information control procedure executed in the image information control apparatus can be stored on a remote computer connected to controller 1210 through a network such as the internet etc, through which the control procedure can be downloaded to the controller 12100.

Furthermore, the image information control program executed in the digital copier is composed of modules including parts described above (memory unit, blocked unit, converting unit, compression unit, and sending/receiving unit etc,). As to actual hardware, CPU 1211 (processor) reads the image information control program from the ROM HDD 1218 described above and executes the program. With that, each part of the modules described above are generated on the main memory of the computer digital copier by CPU 1211. That is the memory unit, blocked unit, converting unit, compression unit and sending/receiving unit etc, are generated on the main memory of the digital copier by CPU 1211.

As described above, image information control apparatus, image information control system, printer driver, image information control, program executing the method in computer, and recording medium of the present invention is useful for image information control technology. Moreover, it can use for document output technology such as a personal computer, color copier, and color facsimile etc.

Obviously, numerous modifications and variations of the present invention are possible in light of the above teachings. It is therefore to be understood that within the scope of the appended claims, the present invention may be practiced otherwise than as specifically described herein.

The invention claimed is:

1. An image information control apparatus comprising:
   a receiving unit configured to receive bit map image data sent from an information process unit;
   an accumulating unit configured to accumulate the image data received from said information process unit line by line;
   a blocked unit configured to group a plurality of lines of said image data into at least two predetermined size blocks of image data, each of said at least two predetermined size blocks including a different amount of lines;
   a converting unit configured to convert the at least two predetermined size blocks, separately into a language command corresponding to said image forming apparatus and including the block of image data;
   a sending unit configured to send the language command to said image forming apparatus;
   a compression unit configured to compress said language command prior to said sending unit sending the language command, wherein said compression unit includes a plurality of different compression technologies, said image information control apparatus further comprising a selecting unit configured to select one of said plurality of different compression technologies for the compression unit to compress said language command; and
   an optimizing unit configured to optimize a condition of image forming by determining whether non-compression should be used or compression should be used to compress said language command, and if compression should be used, what compression technology should be used.

2. The image information control apparatus of claim 1, wherein said optimizing unit comprises at least one of an optimizing function calculator or an optimizing table.

3. The image information control apparatus of claim 2, wherein said optimizing table comprises at least two optimizing parameters from a list comprising:
   a compression rate of the compression;
   a connection system of said image forming apparatus;
   a data size of said bitmap image data; and
   a time required for compression and decompression, wherein said selecting unit selects a compression technology based on said optimizing table.

4. An image information control apparatus comprising:
   a receiving unit configured to receive bit map image data sent from an information process unit;
   an accumulating unit configured to accumulate the image data received from said information process unit line by line;
   a blocked unit configured to group a plurality of lines of said image data into at least two predetermined size blocks of image data, each of said at least two predetermined size blocks including a different amount of lines;
   a converting unit configured to convert the at least two predetermined size blocks, separately into a language command corresponding to said image forming apparatus and including the block of image data;
   a sending unit configured to send the language command to said image forming apparatus; and
   an image identification unit configured to identify whether said data received from said information process unit can be decimated, wherein said image identification unit is configured to identify whether said data received from said information process unit can be decimated based on at least one of a density of the data, a total amount of the data, or a calculated enlargement rate of output image size against an original image size of the image data, if the calculated enlargement rate is judged as less than or equal to a predetermined threshold value.

5. The image information control apparatus of claim 4, further comprising an image decimation unit configured to decimate said image data received from said information process before said accumulating unit accumulates such image data, when said image identification unit determines that an enlargement rate of output image size against original image size is less than a predetermined threshold.

6. An image information control apparatus comprising:
   a receiving unit configured to receive bit map image data sent from an information process unit;
   an accumulating unit configured to accumulate the image data received from said information process unit line by line;
   a blocked unit configured to group a plurality of lines of said image data into at least two predetermined size blocks of image data, each of said at least two predetermined size blocks including a different amount of lines;
   a converting unit configured to convert the at least two predetermined size blocks, separately into a language command corresponding to said image forming apparatus and including the block of image data;
   a sending unit configured to send the language command to said image forming apparatus;
   an image identification unit configured to identify whether said data received from said information process unit can be decimated; and
   an image decimation unit configured to decimate said image data received from said information process unit before said accumulating unit accumulates such image data, when said image identification unit determines that said data received from said information process unit can be decimated, wherein said the decimation unit is configured to decimate said original image data by setting decimation in the x direction and in y direction independently.

7. An image information control apparatus comprising:
   a receiving unit configured to receive bit map image data sent from an information process unit;

an accumulating unit configured to accumulate the image data received from said information process unit line by line;
a blocked unit configured to group a plurality of lines of said image data into at least two predetermined size blocks of image data, each of said at least two predetermined size blocks including a different amount of lines;
a converting unit configured to convert the at least two predetermined size blocks, separately into a language command corresponding to said image forming apparatus and including the block of image data; and a sending unit configured to send the language command to said image forming apparatus;
a compression unit configured to compress said language command prior to said sending unit sending the language command, wherein said compression unit includes a plurality of different compression technologies; and
a selecting unit configured to select one of said plurality of different compression technologies for the compression unit to compress said language command, wherein said selecting unit is configured to determine whether said language command can be compressed using a lossless compression technology, wherein a lossy compression technology is used to compress said language command when the selecting unit determines that a lossless compression technique cannot achieve a compression rate greater than or equal to a predetermined threshold value.

8. An image information control apparatus comprising:
a receiving unit configured to receive bit map image data sent from an information process unit;
an accumulating unit configured to accumulate the image data received from said information process unit line by line;
a blocked unit configured to group a plurality of lines of said image data into at least two predetermined size blocks of image data, each of said at least two predetermined size blocks including a different amount of lines;
a converting unit configured to convert the at least two predetermined size blocks, separately into a language command corresponding to said image forming apparatus and including the block of image data;
a sending unit configured to send the language command to said image forming apparatus;
a compression unit configured to compress said language command prior to said sending unit sending the language command, wherein said compression unit includes a plurality of different compression technologies; and
a selecting unit configured to select one of said plurality of different compression technologies for the compression unit to compress said language command, wherein said selecting unit is configured to select a lossy compression technology when an image identification unit identifies that said image data includes a photographic image.

9. An image information control apparatus comprising:
a receiving unit configured to receive bit map image data sent from an information process unit;
an accumulating unit configured to accumulate the image data received from said information process unit line by line;
a blocked unit configured to group a plurality of lines of said image data into at least two predetermined size blocks of image data, each of said at least two predetermined size blocks including a different amount of lines;
a converting unit configured to convert the at least two predetermined size blocks, separately into a language command corresponding to said image forming apparatus and including the block of image data;
a sending unit configured to send the language command to said image forming apparatus;
a compression unit configured to compress said language command prior to said sending unit sending the language command, wherein said compression unit includes a plurality of different compression technologies; and
a selecting unit configured to select one of said plurality of different compression technologies for the compression unit to compress said language command, wherein said selecting unit is configured to determine whether said language command can be compressed using a lossless compression technology, wherein the selecting unit determines if a non-compression mode has been set when the selecting unit determines that a lossless compression technology can achieve a compression rate greater than or equal to a predetermined threshold value.

10. The image information control apparatus of claim 9, wherein said sending unit sends the language command to said image forming apparatus without compression when the selecting unit determines that a non-compression mode has been set.

11. The image information control apparatus of claim 9, wherein said compression unit compresses the converted block of image data using a lossless compression technology when the selecting unit determines that a non-compression mode has not been set.

12. A method for controlling image information comprising:
receiving bit map image data sent from an information process unit;
accumulating said data sent from said information process unit line by line;
grouping a plurality of lines of said image data into at least two predetermined size blocks of image data, each of said at least two predetermined size blocks including a different amount of lines;
converting the at least two predetermined size blocks, separately into a language command corresponding to said image forming apparatus and including the block of image data; and
sending the language command to said image forming apparatus;
compressing said language command prior to sending the language command, wherein said compressing comprises selecting one of a plurality of different compression technologies for compressing said language command; and
optimizing a condition of image forming by determining whether non-compression should be used or compression should be used to compress said language command, and if compression should be used, what compression technology should be used.

13. The method of claim 12, wherein said optimizing comprises using at least one of an optimizing function calculator or an optimizing table.

14. The method of claim 13, wherein said optimizing table comprises at least two optimizing parameters from a list comprising:
a compression rate of the compression;
a connection system of said image forming apparatus;
a data size of said bitmap image; and
a time required for compression and decompression, wherein said selecting comprises selecting a compression technology based on said optimizing table.

15. A method for controlling image information comprising:
  receiving bit map image data sent from an information process unit;
  accumulating said data sent from said information process unit line by line;
  grouping a plurality of lines of said image data into at least two predetermined size blocks of image data, each of said at least two predetermined size blocks including a different amount of lines;
  converting the at least two predetermined size blocks, separately into a language command corresponding to said image forming apparatus and including the block of image data; and
  sending the language command to said image forming apparatus; and
  identifying whether said data sent from said information process unit can be decimated; wherein said identifying comprises identifying whether said data received from said information process unit can be decimated based on at least one of a density of said data, a total amount of said data or an enlargement rate of output image size against an original image size of the image data, if the calculated enlargement rate is judged as smaller than equal to predetermined threshold value.

16. The method of claim 15, further comprising decimating said image data received from said information process before accumulating such image data, when it is determined that an enlargement rate of output image size against original image size is less than a predetermined threshold.

17. A method for controlling image information comprising:
  receiving bit map image data sent from an information process unit;
  accumulating said data sent from said information process unit line by line;
  grouping a plurality of lines of said image data into at least two predetermined size blocks of image data, each of said at least two predetermined size blocks including a different amount of lines;
  converting the at least two predetermined size blocks, separately into a language command corresponding to said image forming apparatus and including the block of image data; and
  sending the language command to said image forming apparatus;
  identifying whether said data sent from said information process unit can be decimated;
  decimating said image data received from said information process unit before accumulating such image data, when it is determined that said data received from said information process unit can be decimated, wherein said decimating comprises decimating said image data by setting decimation in the x direction and in y direction independently.

18. A method for controlling image information comprising:
  receiving bit map image data sent from an information process unit;
  accumulating said data sent from said information process unit line by line;
  grouping a plurality of lines of said image data into at least two predetermined size blocks of image data, each of said at least two predetermined size blocks including a different amount of lines;
  converting the at least two predetermined size blocks, separately into a language command corresponding to said image forming apparatus and including the block of image data;
  sending the language command to said image forming apparatus; and
  compressing said language command prior to sending the language command, wherein said compressing comprises selecting one of a plurality of different compression technologies for compressing said language command, and wherein said selecting comprises determining whether said language command can be compressed using a lossless compression technology, wherein a lossy compression technology is used to compress said language command when it is determined that a lossless compression technology cannot achieve a compression rate greater than or equal to a predetermined threshold value.

19. A method for controlling image information comprising:
  receiving bit map image data sent from an information process unit;
  accumulating said data sent from said information process unit line by line;
  grouping a plurality of lines of said image data into at least two predetermined size blocks of image data, each of said at least two predetermined size blocks including a different amount of lines;
  converting the at least two predetermined size blocks, separately into a language command corresponding to said image forming apparatus and including the block of image data; and
  sending the language command to said image forming apparatus;
  compressing said language command prior to sending the language command, wherein said compressing comprises selecting one of a plurality of different compression technologies for compressing said language command, and wherein said selecting comprises selecting a lossy compression technology when said image data is identified as including a photographic image.

20. A method for controlling image information comprising:
  receiving bit map image data sent from an information process unit;
  accumulating said data sent from said information process unit line by line;
  grouping a plurality of lines of said image data into at least two predetermined size blocks of image data, each of said at least two predetermined size blocks including a different amount of lines;
  converting the at least two predetermined size blocks, separately into a language command corresponding to said image forming apparatus and including the block of image data; and
  sending the language command to said image forming apparatus;
  compressing said language command prior to sending the language command, wherein said compressing comprises selecting one of a plurality of different compression technologies for compressing said language command, and wherein said selecting comprises determining whether said language command can be compressed using a lossless compression technology, further comprising determining if a non-compression mode has been set when a lossless compression technique can achieve a compression rate larger than or equal to a predetermined threshold value.

21. The method of claim 20, wherein said sending comprises sending said language command to said image forming apparatus without compression when it is determined that a non-compression mode has been set.

22. The method of claim 20, wherein said compressing comprises using a lossless compression technology when it is determined that a non-compression mode has not been set.

23. A method for controlling image information comprising:
   receiving bit map image data sent from an information process unit;
   accumulating said data sent from said information process unit line by line;
   grouping a plurality of lines of said image data into at least two predetermined size blocks of image data, each of said at least two predetermined size blocks including a different amount of lines;
   converting the at least two predetermined size blocks, separately into a language command corresponding to said image forming apparatus and including the block of image data;
   sending the language command to said image forming apparatus; and
   inputting a designated output image resolution from an operator; wherein said selecting comprises selecting lossless compression technology when an image resolution is equal to or greater than a predetermined threshold value.

* * * * *